UNITED STATES PATENT OFFICE.

ADRIEN PINEL, OF LE HOULME, FRANCE.

PROCESS FOR MANUFACTURING GUM OR MUCILAGE FROM LOCUST-BEANS.

1,106,335.  Specification of Letters Patent.  Patented Aug. 4, 1914.

No Drawing.  Application filed July 9, 1912.  Serial No. 708,441.

*To all whom it may concern:*

Be it known that I, ADRIEN PINEL, citizen of the French Republic, residing at Le Houlme, in the Department of the Seine-Inférieure, France, have invented certain new and useful Improvements in Processes for Manufacturing Gum or Mucilage from Locust-Beans, of which the following is a specification.

This invention has reference to a process for manufacturing gum or mucilage from locust beans. This process can be applied to the whole beans, but it is preferable that they should be previously broken up and deprived of the germs as well as a portion of their skin by passing them through a disintegrator and bolting machine in the known manner. They may also be separated and sorted into lots of the same size by screening them after breaking. The beans thus prepared still retain a portion of their skin which is removed by soaking the beans in an alkaline lye, for example a solution of caustic soda at 8 or 10%. A solution of certain alkaline salts may also be employed, such as sodium carbonate or sodium sulfid or the like or even a mixture of these various reagents, the degree of concentration of the solutions employed varying within very large limits. The duration of this alkaline treatment will vary according to the nature, the temperature and the concentration of the reagents employed. For a first operation the effect produced will be verified from time to time by taking samples. If a solution of soda at 10% is employed about 12 to 18 hours will be necessary with a cold solution in order completely to remove the skins.

The decortication is greatly facilitated when using heat, for example a temperature varying between 80° and 100° Celsius, particularly in the case of whole beans, and if to the solution employed for decortication one adds a certain quantity of borax or a soluble borate or even boracic acid if the nature of the solution employed permits the formation of a borate, as would be the case when employing caustic soda. It is to be understood, however, that the decortication of the beans is accomplished either in a cold caustic solution without borax or in a warm solution to which borax has been added and in the latter instance never without borax in the solution, but if the borax is not used in a warm solution, the beans will disintegrate and will partially dissolve so that part of the gum is lost, and moreover it is difficult to remove the fragments of the skin which adhere to the beans which become sticky during the treatment. Where a warm solution is used to which borax is added, a complete decortication of the beans may be accomplished within thirty minutes instead of twelve to eighteen hours, which is necessary where a cold solution without borax is used. Moreover, in a warm solution containing a soluble borate, the skins are reduced to a pulp and may be entirely washed away while in a cold solution containing a caustic material, the skins are detached from the beans as an entirety, and are extremely difficult to remove. During this maceration the beans may be stirred from time to time in the solution which will reduce into small pieces the skins attacked by the solution, whereas the cotyledons which are relatively hard and elastic will remain whole. The pieces of skin will subsequently be easily removed by a rapid rinsing with water on a sheet of metal gauze. The beans thus decorticated will be allowed to drain or dry.

If it is desired to obtain a product more particularly colorless the decorticated beans will be submitted to a second maceration in a fresh solution which will re-dissolve any coloring matter contained in them. The beans thus bleached will be again rinsed in water and dried. After decortication the beans are then macerated in a 3 to 4% solution of borax which can be substituted by another soluble borate, for example potassium borate or by an equivalent quantity of boracic acid, if the beans contain caustic soda absorbed during the decortication. This maceration is for the purpose of rendering the beans fragile and insoluble in water. This result will be obtained more or less quickly according to the size of the beans and the temperature, but generally speaking about 6 hours will be sufficient. The beans will then be drained or dried and reduced to powder in one of the known machines. The damp powder or paste thus obtained can be dried and preserved for subsequent use or even without drying it may be submitted immediately to the final treatments. This consists first in washing by soaking in water, preferably in hot water, in order to remove the excess of reagents which they contain, being subsequently bleached if desired by means of known reagents. The washed and if necessary bleached material is then separated out by decantation, filtration, pressing or drying. After this a paste of definite composition is formed by mixing with the desired quantity of water, then the gum in this paste will be rendered soluble by the addition of sufficient quantity of certain sugars, such as honey, manna, inverted sugar and the like. An antiseptic may also be added to the mixture and it may be neutralized if necessary by adding acid or a salt, such as those of aluminium and zinc.

If very concentrated pastes are prepared it will be preferable instead of using pure water to employ a solution of neutral salts, such as the sulfates or chlorids of alkaline metals in alkaline earths. If quite concentrated pastes have to be produced the drained material or even the squeezed or pressed material will not be mixed with the above salt solutions, but with the dry salts themselves mixed with the necessary sugars. For example in order to obtain a mixture easy to dissolve and dilute, the pressed or squeezed material obtained from 110 kilos of cotyledons will be mixed with 100 kilos of magnesium sulfate and 5 kilos of inverted sugars, these mixtures being made homogeneous by grinding or otherwise and employed in this condition or dried or pulverized for subsequent utilization. The pastes or powders thus obtained very easily dissolve in water, by heating after diluting they give a starching property to the mucilage of special quality.

In certain cases the above described process may be simplified. For example the alkaline decortication will be dispensed with and the broken beans treated directly with borax to which a little soda is preferably added. The treatment will be terminated as above by grinding, washing and rendering soluble. The gum thus obtained is colored by the skin which has not been removed, but may be employed in certain cases. On the other hand the beans may be submitted to an alkaline decortication and the treatment with borax dispensed with. After decortification the beans are then washed by diffusion in water until they begin to dissolve. They are then neutralized by the addition of acid very exactly measured. The gum is subsequently extracted by boiling in water and filtering in known manner. This locust-bean gum is employed for dressing threads and tissues and generally speaking for the same purpose as gum-tragacanth or fecule.

Having now particularly described and ascertained the nature of my invention, I declare that what I claim is:

1. In the process of treating locust beans for a muscilaginous gum, the step which consists in treating the beans with a solution containing a borate to render the beans brittle.

2. In the process of treating locust beans for a muscilaginous gum, the steps which consists in treating the beans with a solution containing an alkaline hydrate and a borate at a raised temperature, pulverizing the beans so treated, washing the resulting powder with water and dissolving it in an aqueous solution of sugar.

3. In the process of treating locust beans for a muscilaginous gum the steps which consist in decorticating the beans in a solution containing alkaline hydrate at a raised temperature, macerating such decorticated beans in a solution of a soluble borate thus rendering the beans brittle, then pulverizing the beans and washing the resulting powder with water, and finally dissolving the powder in an aqueous solution of sugar.

4. The process of treating locust beans for a muscilaginous gum which consists in treating the beans with a solution containing an alkaline hydrate and a borate the temperature of which solution is between 80 and 100 C., macerating said beans into a solution of a soluble borate to render the same brittle, reducing the beans to a powder and soaking the powder in hot water, then removing the water from the powder and pressing and drying the same, then neutralizing the powder with a mineral acid and finally dissolving said powder in a solution containing sugar.

In testimony whereof I affix my signature in presence of two witnesses.

ADRIEN PINEL.

Witnesses:
O. Mitz,
Maurice d'Ouysi.